May 29, 1923.

W. H. LIEBER

THRUST BEARING

Filed March 24, 1921

Inventor
W. H. Lieber
by
Attorney

Patented May 29, 1923.

1,457,081

UNITED STATES PATENT OFFICE.

WILLIAM H. LIEBER, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

THRUST BEARING.

Application filed March 24, 1921. Serial No. 455,017.

*To all whom it may concern:*

Be it known that WILLIAM H. LIEBER, a citizen of the United States, residing at West Allis, in the county of Milwaukee and State of Wisconsin, has invented a certain new and useful Improvement in Thrust Bearings, of which the following is a specification.

This invention relates in general to bearings and has particular relation to bearings of the thrust type, wherein special provisions are made for reducing friction to a minimum through the production of a film of lubricating fluid under pressure between relatively movable bearing surfaces.

It is an object of this invention to provide an improved thrust bearing wherein the relatively movable bearing elements are of special design and construction to facilitate the production and maintenance of the desired film of lubricating material under pressure between the active bearing surfaces during the operation of the shaft with which the bearing is associated.

It is a further object of this invention to provide a thrust bearing of improved design and construction wherein one of the relatively movable bearing elements includes a plurality of bearing shoes or pads of such design and construction and so mounted relative to the fixed and movable bearing elements as to facilitate the formation and maintenance of a film of lubricating fluid under pressure during the operation of the movable bearing element and shaft associated therewith, and wherein the general construction and design of the bearing especially adapts it for high speed work, in that the friction and wear usually present between the relatively rotatable bearing surfaces are effectively reduced by distributing such friction and wear over a series of pairs of co-operating bearing surfaces.

A further object of this invention is to provide a bearing of this type and design involving the use of an intermediate bearing element having a movement of rotation relative to those parts of the bearing structure which, in the ordinary bearing, are considered as the relatively fixed and movable parts, this intermediate element being intended to operate at a speed approximately one half that of the shaft and to be equally effective for either direction of shaft rotation.

It is a further object of this invention to provide a bearing of this type and design involving the use of an intermediate bearing element which is rotatable relatively to the usual fixed and movable bearing parts and comprises a plurality of bearing portions or shoes formed as a single piece element and co-operable with the relatively fixed and movable bearing elements and of such design and construction as to facilitate the production of a desired film of lubricating fluid under pressure.

These and other objects and advantages are attained by this invention, the various novel features of which will appear from the description and drawings disclosing one embodiment of such invention, and will be more particularly pointed out in the claims.

Figure 1:
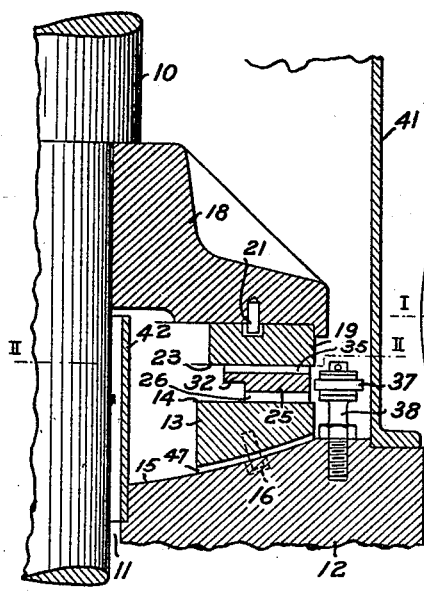
Fig. 1 is a fragmentary sectional elevation of apparatus provided with a thrust bearing embodying features of this invention, the plane of section being that of the line I—I of Fig. 2.
Figure 2:
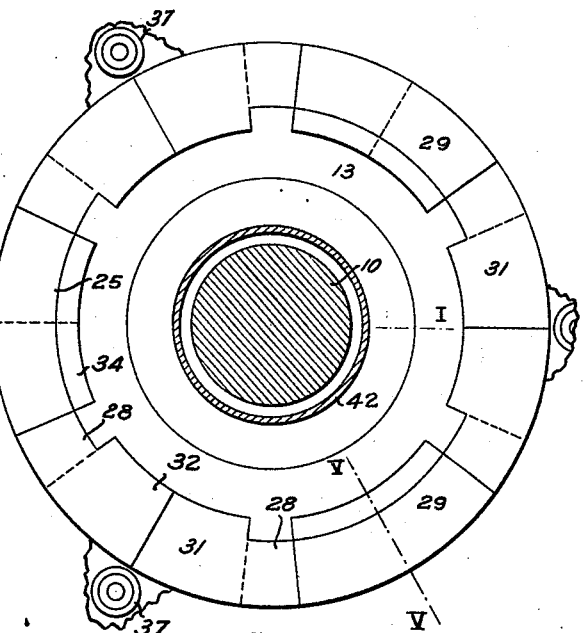
Fig. 2 is a sectional plan view along the line II—II of Fig. 1.

In the embodiment of the invention disclosed in the drawings, the shaft 10 of a machine, which may be considered as a vertical shaft machine of any desired character, passes through a central opening 11 in the base or bearing support 12. An annular thrust collar or bearing member 13 having a bearing face 14 at its upper side is provided. This collar may be a separate element directly supported on the bearing support, 12, as shown in Fig. 1, or it may be integral with the bearing support. The thrust collar 13 is provided at its lower side with a spherical seat designed for co-operative engagement with a similarly formed spherical seat 15 at the upper side of the bearing support 12, the arrangement being such as to provide for the relative movement necessary to properly distribute the thrust exerted by the shaft and the machine carried thereby, upon the thrust collar 13. The thrust collar 13 is held against appreciable movement upon the bearing support 12 by means of a pin and slot arrangement indicated at 16, which permits sufficient shifting of the element 13 on its spherical seat in any direction so as to accommodate and provide for equalization of any unbalanced thrust exerted on the bearing collar 13.

An annular support or thrust collar 18 is connected or otherwise fixed to the shaft 10 to rotate therewith, and this collar carries or rests upon an annular bearing member 19 which may be in the form of a single piece ring or collar, the bearing element being connected in driving relation with the collar 18 and held against appreciable movement relative thereto, by means of a pin and slot arrangement, indicated at 21. The bearing collar 19 has a machined bearing surface 23 at its lower side.

Interposed between the bearing collars 13 and 19 is a bearing element 25, this element being indicated herein as a single piece ring recessed or having portions removed at spaced points on its lower side as indicated at 26, and similar recesses 27 at spaced points at its upper side. Intermediate these recessed portions are solid or unrecessed portions 28, the latter being joined by portions 29 and 31 which are axially opposite the recesses 26 and 27, respectively, the parts 28, 29 and 31, being integrally formed in the preferred construction, as indicated herein. The recesses on one axial side of the element 25 are circumferentially intermediate those on the other axial side. With this latter arangement, the portions 29 are above the recesses 26, and the portions 31 are below the recesses 27. The upper surfaces of the portions 29 and the solid portions 28 are in the same plane and form a bearing face normally in engagement with the bearing surface 23 of the upper thrust collar 19, while the lower surfaces of the portions 31 and of the solid or rigid portions 28 are in a single plane and form a bearing face in engagement with the upper bearing surface 14 of the thrust collar 13. The portions 29 and 31 are slightly flexible or resilient, especially at the portion intermediate adjacent rigid parts 28. The bearing portions or shoes 29 have portions of reduced thickness 32 at their radially inner side; and the bearing portions or shoes 31 have similar portions of reduced thickness 34 at their radially inner side. These portions 32 and 34 extend radially inward beyond the rigid portions 28 and, hence, having less direct support, are more readily deflectable from normal position.

It will be apparent that the upper surfaces of adjacent portions 28 and the bearing portion 29 intermediate said adjacent portions 28 form spaced bearing faces in operative engagement with the bearing surface 23 of the thrust collar 19. Likewise, the lower surfaces of adjacent portions 28 and the intermediate bearing portions 31 constitute spaced bearing faces in operative engagement with the upper bearing surface 14 of the thrust collar 13. It will be apparent also that the bearing portions at the upper side of the intermediate ring 25 are staggered with relation to those of the lower side thereof, and that the bearing portions or shoes at both the upper and lower side of the intermediate ring are free to bend or deflect to a slight extent in an axial direction, especially at the circumferentially intermediate parts of the shoes, and also that the radially inner portions 32 and 34 are free to bend with increased facility.

The intermediate ring element 25 is free to rotate relatively to either or both of the bearing elements 13, 19 and may be guided and maintained in operative position relative thereto through co-operation with guiding means of any suitable form. The specific form of guiding means shown herein includes a plurality of spaced rollers 37 designed for engagement with the radially outer side of the intermediate ring and mounted for rotation upon pins 38 supported in the bearing support or base 12.

A bearing housing 41 is supported by the bearing support 12, being spaced from the bearing elements 13, 19 and 25. The annular support 12 is provided at its radially inner edge with a cylindrical tube 42 secured in position as by being threaded in the support 12, and this tube is of such dimensions as to be entirely free of the shaft 10 and to extend above the plane of engagement of the bearing surface 23 of the bearing element 19 and the bearing surface of the bearing shoes 29 of the intermediate bearing element 25. The tube 42 thus acts as a dam for confining a body of oil in which the active bearing elements are immersed, the housing 41 being filled with oil to a point above the plane of the above mentioned co-operative bearing surfaces and below the upper edge of the tubular element 42.

The bearing member 13 on the bearing support 12 may be provided with radial ducts 47 for providing communication between the space outside of said thrust collar and the space radially within the thrust collar. As indicated herein, these ducts are in the form of grooves on the lower side of the thrust collar 13. However, they may assume any form suitable for accomplishing the purpose of providing the desired communication between the radially outer and radially inner sides of the active bearing elements.

Figure 3:
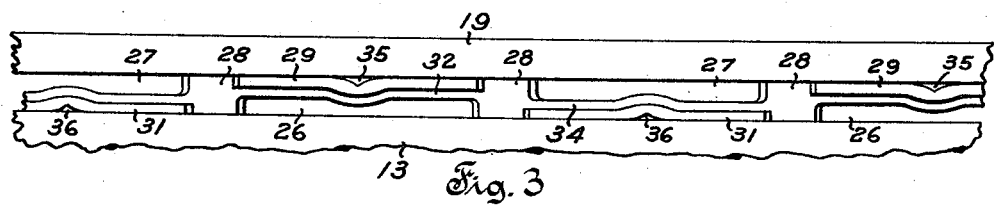
Fig. 3 is a view in elevation of the active parts of the bearing of Figs. 1 and 2, said active parts being developed and the view being taken from a point radially within the bearing structure, the bearing elements being considered at rest.

When the bearing and shaft associated therewith are at rest, the intermediate bearing element is in the form shown in Fig. 3 wherein the upper bearing surfaces of the portions 28 and 29 are in intimate contact throughout with the lower bearing surface 23 of the thrust collar 19, and the lower bearing surfaces of the portions 28 and 31 are in intimate engagement with the upper bearing surface 14 of the thrust collar 13.

Figure 4:
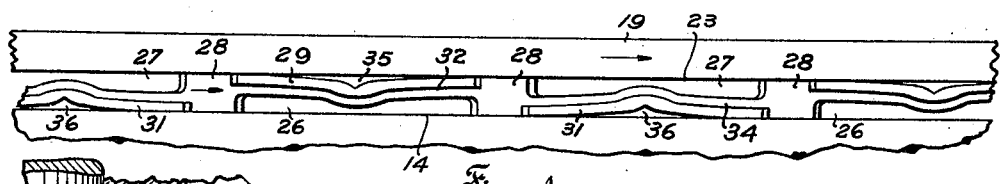
Fig. 4 is a view similar to Fig. 3, but with the bearing elements and the shaft considered in operation.
Figure 5:
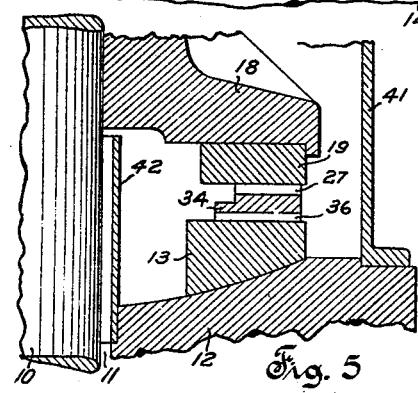
Fig. 5 is a view similar to Fig. 1 with the plane of section that of the line V—V of Fig. 2.

During operation of the shaft 12, assuming the direction of rotation as indicated in Fig. 4, oil is free to circulate through the radial ducts 47, the normal flow through these ducts being radially inward to the space radially within the bearing elements, whence it is thrown or dragged out by centrifugal force and the circumferential drag due to or permitted by the viscosity of the oil, the general direction of movement of the oil corresponding to a resultant of that due to centrifugal force and the circumferential whirl or drag caused by the rotating element of the bearing. The oil is free to move through the recesses 26 and 27 at opposite radial sides of the intermediate bearing element 25, and also, when the speed of rotation is sufficiently high, between the bearing surfaces of the portions 29 and 31 of the intermediate bearing element 25 and the co-operative bearing surfaces of the bearing members 19 and 31. This continuous circulation of oil inwardly through the ducts 47 and outwardly around and across the active bearing surfaces keeps the active bearing elements continuously flooded with an ample supply of lubricating fluid.

As the ring 25 and the bearing portions or shoes 29 and 31 thereof are free to rotate, it will be apparent that there will be relative rotation between this ring 25 and one or both of the bearing elements 31 and 19. Whatever actual rotation there may be of the ring 25 with its bearing shoes 29 and 31, will be in the same direction as the rotatable bearing element 19, the intermediate ring being carried or dragged along to a greater or less degree by the rotatable element of the bearing.

It will be apparent that the amount of oil passing about and across the bearing surfaces of the intermediate ring will be dependent upon the speed of rotation of the rotatable bearing element. As the speed of the shaft increases, the oil in the space within the bearing elements and at the bearing surfaces is under greater pressure, this pressure being due to centrifugal force and the circumferential drag or swirl exerted upon the oil. With increase in the speed of the rotating bearing member 19 and the intermediate ring 25, the oil in each groove 35 and 36 at the bearing surfaces of the shoes 29 and 31, respectively, has increasingly greater pressure exerted thereon tending to force or drag the oil radially outward and circumferentially so as to form wedge-shaped films of oil, the bases of the wedges resting at the grooves. It will be apparent that as the oil between the relatively movable bearing surfaces at both the upper and lower sides of the intermediate bearing ring is put under increasing pressure as the rotational speed of the shaft increases, this pressure finally becomes effective to exert a tilting or bending effect on the intermediate portions of the bearing shoes 29 and 31, thus increasing the circumferential length of the wedges as the material of the bearing shoes 29 and 31 is deflected adjacent the grooves 35 and 36.

When the speed of the shaft is at a value corresponding to normal operation, the pressure developed on these wedge-shaped bodies of oil is sufficient to force the oil practically fully across the entire co-operative bearing surfaces of the bearing elements, thus establishing oil films which are effective to float or lift the movable thrust collar 19 from the bearing shoes 29 of the intermediate ring and, likewise, to float or lift the bearing shoes 31 of the intermediate collar from the fixed bearing element 13.

The actual speed of the intermediate ring 25 will be at some point between zero and that of the movable bearing element 19, depending upon the ratio between the friction present between the bearing shoes 29 and the thrust collar 19 and that between the bearing shoes 31 and the relatively fixed bearing element 13. This floating of one bearing element substantially out of actual engagement with the co-operative bearing element through the action of a film of oil under pressure, thus substantially avoiding metal contact, causes a great reduction in the frictional losses of the bearing in operation.

If the direction of rotation is opposite to that indicated in Fig. 4, it will be apparent that the parts are equally effective to produce the desired films of lubricating fluid under pressure between active bearing surfaces of the intermediate ring 25 and the relatively fixed and movable thrust collars 13 and 19. Substantially the only difference that may exist for rotation in the opposite direction would be that the wedge-shaped films of oil would be more elongated in the direction opposite to that existing for rotation as shown in Fig. 4.

While the above explanation may not be exact as to all details of the physical effects attending the development and maintenance of the film of lubricating fluid under pressure between the active bearing surfaces of the bearing elements, nevertheless, it is certain that desirable operating results may be secured with bearing structures embodying features of the present invention.

It should be understood that it is not desired that the invention claimed be limited to the exact details of construction shown and described, for obvious modifications may occur to a person skilled in the art.

It is claimed and desired to secure by Letters Patent:

1. In a thrust bearing for a shaft, relatively rotatable bearing members having opposed bearing surfaces, and a bearing element interposed between said bearing members and comprising a plurality of bearing portions having bearing faces co-operative with the bearing surfaces of said bearing members, one half of said bearing portions being co-operative with the bearing surface of only one of said bearing elements and the other half being cooperative with the bearing surface of only the other one of said bearing elements, the bearing portions of the two groups being arranged in alternating relation.

2. In a thrust bearing for a shaft, relatively rotatable bearing members having opposed bearing surfaces, and a bearing element interposed between said bearing members and comprising a plurality of bearing portions having bearing faces co-operative with the bearing surfaces of said bearing members, one half of said bearing portions being undercut at one axial side, and the other half of said bearing portions being undercut at the opposite axial side whereby each of said bearing portions is co-operative with only one of said bearing members.

3. In a thrust bearing for a shaft, relatively rotatable bearing members having opposed bearing surfaces, and a bearing element interposed between said bearing members and comprising a plurality of bearing portions having bearing faces co-operative with the bearing surfaces of said bearing members circumferentially adjacent bearing portions of said bearing element being undercut at opposite axial sides of said bearing element to permit deflection in opposite axial directions of the bearing faces of adjacent bearing portions.

4. In a thrust bearing for a shaft, relatively rotatable bearing members having opposed bearing surfaces, and a bearing element interposed between said bearing members and having bearing faces co-operative with the bearing surfaces of said bearing members, said bearing element comprising a plurality of bearing portions having their bearing faces deflectable from normal position, said bearing portions each having a bearing face at only one axial side, and adjacent bearing portions having their bearing faces at opposite axial sides of said bearing element.

5. In a thrust bearing for a shaft, relatively rotatable bearing members having opposed bearing surfaces, and a bearing element disposed between said bearing members and comprising a plurality of spaced deflectable bearing portions, said deflectable bearing portions each having a bearing face co-operative with the bearing surface of one only of said bearing members, and adjacent deflectable bearing portions having their bearing faces at opposite axial sides.

6. In a thrust bearing for a shaft, relatively rotatable bearing members having opposed bearing surfaces, and a bearing element disposed between said bearing members and comprising a plurality of spaced deflectable bearing portions connected by relatively rigid portions, said deflectable portions each having a bearing face co-operative with the bearing surface of one only of said bearing members, adjacent deflectable bearing portions having their bearing faces at opposite axial sides, and said relatively rigid portions being provided with bearing faces at both axial sides.

7. In a thrust bearing for a shaft, relatively rotatable bearing members having opposed bearing surfaces, and a bearing element disposed between said bearing members and comprising a plurality of spaced relatively flexible bearing portions each of said flexible portions having a bearing face at one axial side, said bearing face being provided with a recess having a radial directional component, and adjacent flexible portions of said bearing elements having their bearing faces on opposite axial sides of said element.

8. In a thrust bearing for a shaft, relatively rotatable bearing members having opposed bearing surfaces, and a bearing element interposed between said bearing members and comprising a single piece ring having a plurality of bearing portions having bearing faces co-operative with the bearing surfaces of said bearing members, one group of said bearing portions having their bearing faces at one axial side of said bearing element, another group of said bearing portions having their bearing faces at the other axial side of said bearing element, the bearing portions of the two groups being arranged in alternating relation, and said bearing portions being undercut at the side opposite the bearing faces thereof to provide increased flexibility adjacent the central part of each bearing portion.

9. In a thrust bearing for a shaft, relatively rotatable bearing members having opposed bearing surfaces, and a bearing element disposed between said bearing members and comprising a plurality of spaced deflectable bearing portions connected by relatively rigid portions, said deflectable portions extending radially inward beyond said relatively rigid portions and each having a bearing face co-operative with the bearing surface of one only of said bearing members, and adjacent deflectable bearing portions having their bearing faces at opposite axial sides.

10. In a thrust bearing for a shaft, relatively rotatable bearing members having opposed bearing surfaces, a bearing element interposed and free to rotate between said bearing members and provided with bearing faces co-operative with the bearing surfaces of said members, said bearing element comprising a plurality of spaced rigid portions having bearing surfaces on both axial sides, and intermediate portions connecting said rigid portions, each of said intermediate portions being provided with a bearing face at one axial side only and undercut at the side opposite its bearing face, and adjacent intermediate portions having their bearing faces at opposite axial sides and being deflectable in response to the production of a film of oil under pressure at said bearing faces during the operation of said bearing.

11. In a thrust bearing for a shaft, relatively rotatable bearing members having opposed bearing surfaces, and a bearing element interposed between said bearing members and comprising spaced axially deflectable bearing portions at opposite axial sides of said bearing element and having bearing faces co-operative with the bearing surfaces of said bearing members.

12. In a thrust bearing for a shaft, relatively rotatable bearing members having opposed bearing surfaces, and a bearing element interposed between said bearing members and comprising spaced axially deflectable bearing portions at opposite axial sides of said bearing element and having bearing faces co-operative with the bearing surfaces of said bearing members, each of said deflectable bearing portions being supported adjacent a circumferential edge thereof to facilitate deflection thereof.

13. In a thrust bearing for a shaft, relatively rotatable bearing members having opposed bearing surfaces, and a bearing element interposed between said bearing members and comprising spaced axially deflectable bearing portions at opposite axial sides of said bearing element and having bearing faces co-operative with the bearing surfaces of said bearing members, said deflectable bearing portions being connected by relatively rigid portions and extending radially inward beyond said relatively rigid portions.

14. In a thrust bearing for a shaft, a bearing element comprising a plurality of spaced, relatively rigid portions, and axially deflectable portions having bearing faces and extending from said rigid portions at opposite axial sides thereof.

15. In a thrust bearing for a shaft, a bearing element comprising a plurality of spaced, relatively rigid portions, and axially deflectable portions having bearing faces and extending from said rigid portions at both axial sides thereof, the radially inner edges of said deflectable portions being of increased flexibility.

16. In a thrust bearing for a shaft, a bearing element comprising a plurality of spaced, relatively rigid portions, and axially deflectable portions having bearing faces extending from each of said relatively rigid portions at opposite axial sides thereof.

17. In a thrust bearing for a shaft, a bearing element comprising a plurality of spaced, relatively rigid portions, and axially deflectable portions having bearing faces and connecting said relatively rigid portions along opposite axial sides of the bearing element.

18. In a thrust bearing for a shaft, a bearing element comprising a plurality of spaced, relatively rigid portions, and axially deflectable portions having bearing faces and connecting said relatively rigid portions along opposite axial sides of the bearing element, said connecting portions having radially inner portions of increased flexibility.

19. In a thrust bearing for a shaft, a bearing element comprising a plurality of spaced, relatively rigid portions, and axially deflectable portions having bearing faces and connecting adjacent rigid portions, adjacent connecting portions having their bearing faces at opposite axial sides of the bearing element.

In testimony whereof, the signature of the inventor is affixed hereto.

WILLIAM H. LIEBER.